US005103546A

United States Patent [19]

Rossini et al.

[11] Patent Number: 5,103,546

[45] Date of Patent: Apr. 14, 1992

[54] PROCESS FOR PREPARING A STRIP OF FLEXIBLE CLOSURE MATERIAL TO BE APPLIED TO A RECEPTACLE

[75] Inventors: Steven J. Rossini, St. Paul; Daniel J. Wilson; Shari J. Wilson, both of Minneapolis, all of Minn.

[73] Assignee: Minnesota Mining and Manufacturing Company, St. Paul, Minn.

[21] Appl. No.: 611,040

[22] Filed: Nov. 9, 1990

[51] Int. Cl.[5] ........................ B23P 11/02; B65D 33/30

[52] U.S. Cl. ........................................ 29/450; 29/410; 29/414; 29/453; 24/576; 383/63

[58] Field of Search ................. 29/408, 409, 410, 411, 29/412, 413, 414, 415, 416, 446, 450, 451, 453, 455.1; 206/620, 621; 24/575, 576, 577, 578; 156/66; 229/66; 383/62, 63, 64, 65; 53/450, 451, 452, 453

[56] References Cited

U.S. PATENT DOCUMENTS

| | | | |
|---|---|---|---|
| 3,198,228 | 8/1965 | Naito | 383/65 |
| 3,685,562 | 8/1972 | Ausnit | 383/63 X |
| 3,720,141 | 3/1973 | Stock | 383/63 X |
| 3,780,781 | 12/1973 | Uramoto | 206/620 |
| 3,948,705 | 4/1976 | Ausnit | 383/63 X |
| 4,186,786 | 2/1980 | Kirkpatrick | 383/63 |
| 4,528,224 | 7/1985 | Ausnit | 383/63 X |
| 4,629,524 | 12/1986 | Ausnit | 156/66 |
| 4,698,274 | 10/1987 | Ausnit et al. | 383/63 X |
| 4,731,911 | 3/1988 | Gould | 24/576 X |
| 4,734,148 | 3/1988 | Meyer | 383/9 X |
| 4,835,835 | 6/1989 | Gould | 29/527.2 |
| 4,875,259 | 10/1989 | Appeldorn | 24/576 |
| 4,909,870 | 3/1990 | Gould et al. | 156/66 |
| 4,957,571 | 9/1990 | Cipolla | 383/63 X |

*Primary Examiner*—Joseph M. Gorski
*Assistant Examiner*—Peter Dungba Vo
*Attorney, Agent, or Firm*—Gary L. Griswold; Walter N. Kirn; Mark W. Binder

[57] ABSTRACT

A process and apparatus is described for providing a strip of flexible closure material to be affixed to a receptacle. The strip of flexible closure material comprises a combination of a plurality of interengaging strip portions in their interengaged state. The process includes the step of supplying a tape of flexible closure material having a transverse width with a plurality of interengaging elements across the transverse width that extend from the tape. Then, the tape is separated along its longitudinal length into a plurality of strip portions with at least two of the strip portions having an interengaging element extending therefrom. Lastly, the strip portions having an interengaging element are brought into contact with one another while mating the interengaging element of each of the strip portions brought together with that of the other. The process takes place continuously in line with equipment for affixing the flexible closure material to a receptacle. The separating step is accomplished by tearing the supplied flexible closure tape along its longitudinal length.

24 Claims, 5 Drawing Sheets

PROCESS FOR PREPARING A STRIP OF FLEXIBLE CLOSURE MATERIAL TO BE APPLIED TO A RECEPTACLE

TECHNICAL FIELD OF THE INVENTION

The present invention relates to a process and apparatus for preparing a strip of flexible closure material that is made up of at least two interengaged flexible strip portions. More specifically, the process and apparatus convert a single supplied flexible closure tape into the interengaged strip portions of the closure material in line with additional receptacle manufacturing equipment. Typically, the flexible closure strip is applicable to a flexible receptacle such as a plastic bag or the like.

BACKGROUND OF THE INVENTION

Many types of flexible closures exist in the art of reclosable receptacles provided with such flexible closure means. Typically, such flexible closure means are made up of one strip of a male interlocking element and a second strip of a female interlocking element. The male and female elements together provide that which is commonly referred to as a mechanically interlocking closure. Examples of this type of closure are well known in the art including an interlocking closure available from Dow Chemical Company of Midland, Mich. sold under the trademark "Ziploc". Other examples are shown and described in U.S. Pat. Nos. 4,186,786 to Kirkpatrick, 3,198,228 to Naito and 3,780,781 to Uramoto.

In each of these references, a male interlocking strip is provided on one side of a flexible bag and a female interlocking strip is provided opposite to the male strip on an opposed side of the bag. The mouths of the bags are sealed closed by pressing the male and female closure strips against one another, causing macro-deformation of the male or female elements or both, until the elements are interfitted within one another and interengaged to seal the bag.

Another type of flexible closure material is available from Minnesota Mining and Manufacturing Company of St. Paul, Minn. which is described as an intermeshable article in U.S. Pat. No. 4,875,259 to Appeldorn, issued Oct. 24, 1989. Reference is also made to copending application Ser. No. 325,272 filed Mar. 22, 1989 describing such an intermeshable article specifically provided as an intermeshable closure for a container. In this intermeshable type of flexible closure, a plurality of strips of closure material having similar interengaging elements on each strip are interengaged with one another. Moreover, the flexible closure does not include any mechanical interlocking or macro-deformation of the interengaging elements. The closure material provides a receptacle seal similar to the mechanical interlocking types described above but which only requires intermeshing of the similar interengaging elements. The coefficient of friction of the strip material and the angle of the interengaging faces of the interengaging elements adequately provide a sealable receptacle closure. The terms interengaged and derivatives thereof as used throughout this application are meant to encompass both interlocking and intermeshing closure elements as distinguished from one another above.

No matter whether the interengaging closure system to be used is a mechanical interlocking type closure system or an intermeshing closure type system, it is imperative that the strips of flexible closure material be accurately aligned on the surfaces of the receptacle to be sealed and with respect to one another. Moreover accurately aligning the strips includes the step of affixing the closure strips, whether male and female closure strips or similar intermeshable element strips. Typically, the affixation is accomplished by heat sealing the strips of closure material to the receptacle material, such as a polymeric film in the case of a flexible plastic bag, with or without adhesive, or by extruding the male and female closure strips integrally with the film of the receptacle when the film is extruded.

An example of a reclosable bag including male and female closure strips extruded integrally with the film of the reclosable bag is disclosed in the above referenced U.S. Pat. No. 3,198,228 to Naito. Specifically, the closure elements are extruded with the film as a flat film which is folded intermediate of the closure elements along the longitudinal lengths thereof so that the closure strips align with one another to form the reclosable feature. This process requires an accurate folding of the film intermediate of the longitudinally extending closure strips such that accurate alignment of the strips to one another is accomplished. Moreover, the extrusion process controls the formation of the closure strips with respect to one another in parallel to one another. This process is significantly disadvantageous in that it is very difficult to change the positions of the closure strips on the bag, since any relocation thereof requires modification of the extruder head. Moreover, the process requires a specialized dedicated extruder for making the integral film and closure as opposed to using a conventional film extruder. Furthermore, the process disadvantageously requires very precise folding techniques in the bag formation step. All of these disadvantages increase the cost of production of such bags with reclosable closure means.

Otherwise, in order to bring separately extruded flexible closure strips to the receptacle material, such as film, it has been necessary to supply the two separate closure strips to the point of application and affixation of the closure strips to the receptacle material and bag formation. In this case, it can easily be understood that it is most important to accurately align the flexible closure strips on the opposed surfaces of the receptacle and with respect to one another. This being most difficult to do and requiring complex machinery. Moreover, separate supplies are required for each strip of closure material as well as for the receptacle forming material.

Another disadvantage associated with separately produced closure strips is that the process sometimes requires that the extruded flexible closure material be cut or trimmed into the relatively small width strip portions that are required to be applied to the receptacle. Typcially, the width of each closure strip is approximately one quarter inch or less. In the case of the intermeshable closure material described in the Appeldorn, U.S. Pat. No. 4,875,259, since the closure strips are similar to one another, it is sometimes necessary to cut or trim the closure strips down in size to the approximately one quarter inch or less before they can be applied to the receptacle. In this regard, it has been found to be increasingly difficult to size the closure material into decreasingly narrow strip portions. Moreover, during such cutting or trimming of the material in production, the outer edges of the strip portions may not be uniform. Specifically, the edges of the strip portions may vary side to side by a few grooves. This makes it even more difficult to align the interengaging elements of the strip portions on the receptacle with respect to one another.

Moreover, when dealing with plural separately produced and supplied strips of closure material (either interlocking or intermeshing), it is very unlikely that the plural strips would have been manufactured at the same time and under the exact same conditions. Thus, it is likely that the strips will be characterized by slightly different calipers and other qualities, which tends to make the alignment of the strips on a receptacle even more difficult.

SUMMARY OF THE INVENTION

The present invention includes a process and an apparatus for providing a strip of flexible closure material which can be easily sized, accurately aligned, and applied to a receptacle which overcome the aforementioned deficiencies and disadvantages associated with the prior art. Moreover, the process and apparatus of the present invention will ensure even edges of the strip portions such that quick and accurate alignment is facilitated, and is applicable to both intermeshing closure interengaging elements as well as mechanical interlocking closure interengaging elements.

Such a process and apparatus is achieved by the present invention for providing a strip of flexible closure material to be affixed to a receptacle, wherein the strip of flexible closure material comprises a combination of a plurality of interengaging strip portions in their interengaged state. The process first includes the step of supplying a tape of flexible closure material having a transverse width with a plurality of interengaging elements across the transverse width that extend from the tape. The term tape as used throughout this application is not meant to imply anything more than a continuous flexible narrow strip of material. Next, the tape is separated along its longitudinal length into a plurality of strip portions with at least two of the strip portions having an interengaging element extending therefrom. Lastly, the strip portions having an interengaging element are brought into contact with one another while mating the interengaging element of each of the strip portions brought together with that of the other.

The process according to the present invention advantageously takes place continuously in line with other receptacle manufacturing equipment for affixing the combination strip of flexible closure material to the receptacle forming material and for the formation of the receptacle. More specifically, the separating takes place by tearing the tape along its longitudinal length. If the supplied tape is of the intermeshing type including longitudinally extending interengaging elements, then the tearing takes place intermediate of any two of the longitudinal interengaging elements thereby ensuring even edges on both sides of the tear. This is particularly beneficial in that the edges can then be accurately aligned with respect to one another and to edges of the receptacle. Other advantages lie in the utility of the present invention in the fact that the tape of unmated flexible closure material can be processed at the time of need within the entire receptacle forming process, and can be torn into two or more strips and mated together all in the same process. Moreover, the material is uniform in caliper and manufacturing characteristics since it is from the same area of the extruded width of tape. According to the technique of supplying two independent strips as discussed above in the Background of the Invention, there is no guarantee that the closure strips to be interengaged were formed under similar conditions, which will likely cause slight variations in strip characteristics. It is very likely that the strips would have been made into the strips at different times.

The apparatus of the present invention comprises a means for supplying the tape of flexible closure material having a transverse width with a plurality of interengaging elements across the transverse width extending from the tape. A separation means divides the tape along its longitudinal length into a plurality of strip portions with at least two of the strip portions having an interengaging element extending therefrom. A mating means guides the plurality of strips with interengaging elements into contact with one another while positioning the interengaging element of each of the strip portions brought together to engage with that of another. The apparatus is advantageously used in line with other production equipment so that the originally supplied tape of closure material can be torn, mated and introduced into the line as required by the equipment for applying the closure material to the receptacles. Moreover, the apparatus is applicable to any equipment being used to make such receptacles and packages. Since the apparatus requires only a single supply of unmated closure material the design beneficially results in a substantial cost reduction as compared to the dual supply method discussed above.

Furthermore, the process and apparatus of the present invention can be used to serially separate by tearing multiples of such strip portions by running, first, the tape of flexible closure material through a first tearing station, and subsequently, one or more of the first separated strip portions through an additional tearing station or stations. In one preferred process, a single width tape of flexible closure material is supplied and split into a narrow strip and a wide strip, and then the wide strip is once again split substantially equally. The narrow strip is thus advantageously provided at the same required speed and frequency as the other equal strips. The equal strips are then used to form a closure, and the narrow strip is used as a package tear strip. Both the tear strip and the closure are applied at a package forming station at substantially equal lengths.

The present invention will be more fully described with reference to the accompanying drawings, wherein a preferred embodiment of the apparatus for providing the process of the present invention is specifically described.

DETAILED DESCRIPTION OF THE PREFERRED EMBODIMENT

Figure 1:
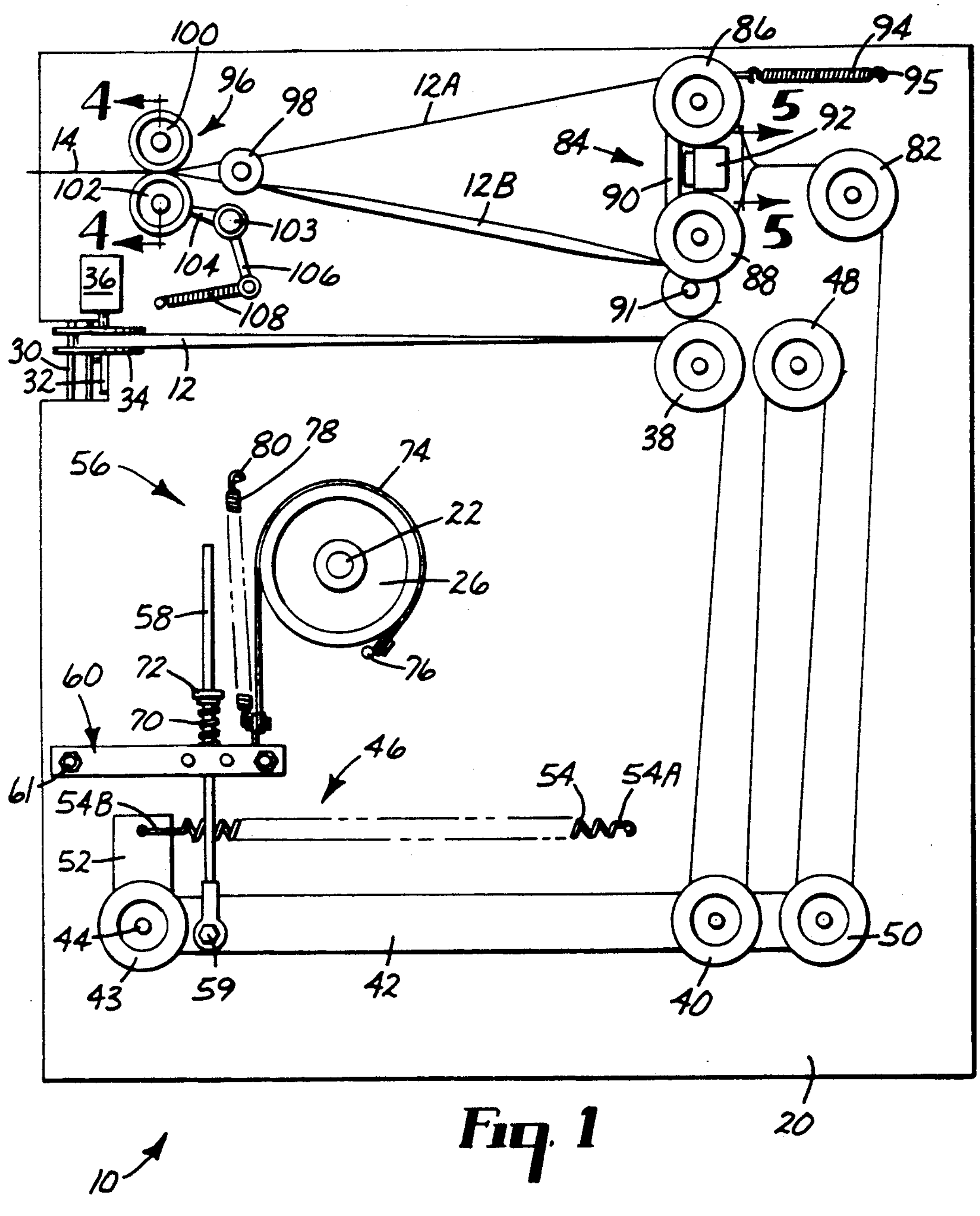
FIG. 1 is a front view in elevation of the preferred apparatus for supplying, separating and mating a strip of flexible closure material in accordance with the present invention.
Figure 2:
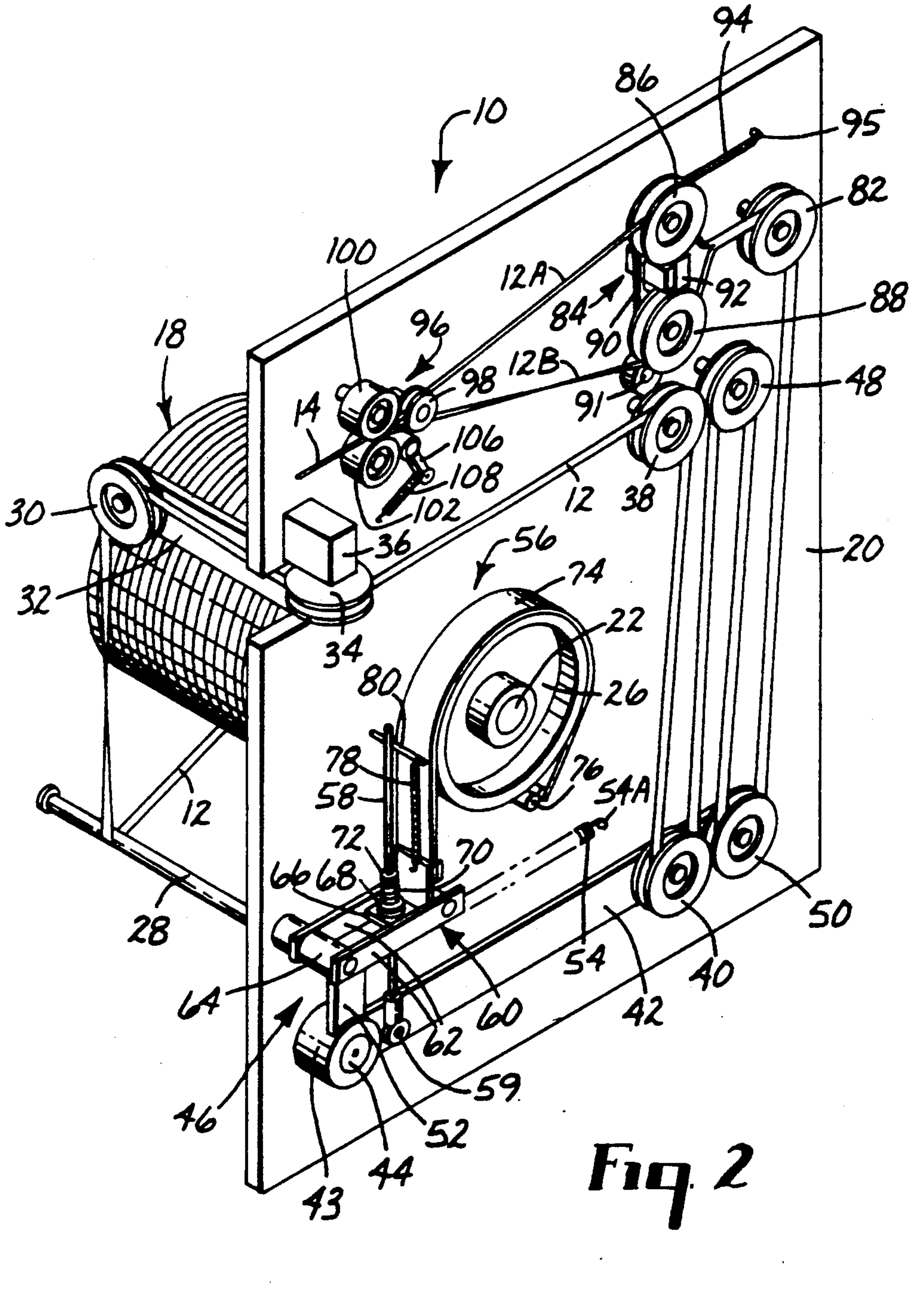
FIG. 2 is a perspective view of the apparatus illustrated in FIG. 1 further illustrating the supplying, separating and mating of the flexible closure material.
Figure 3:
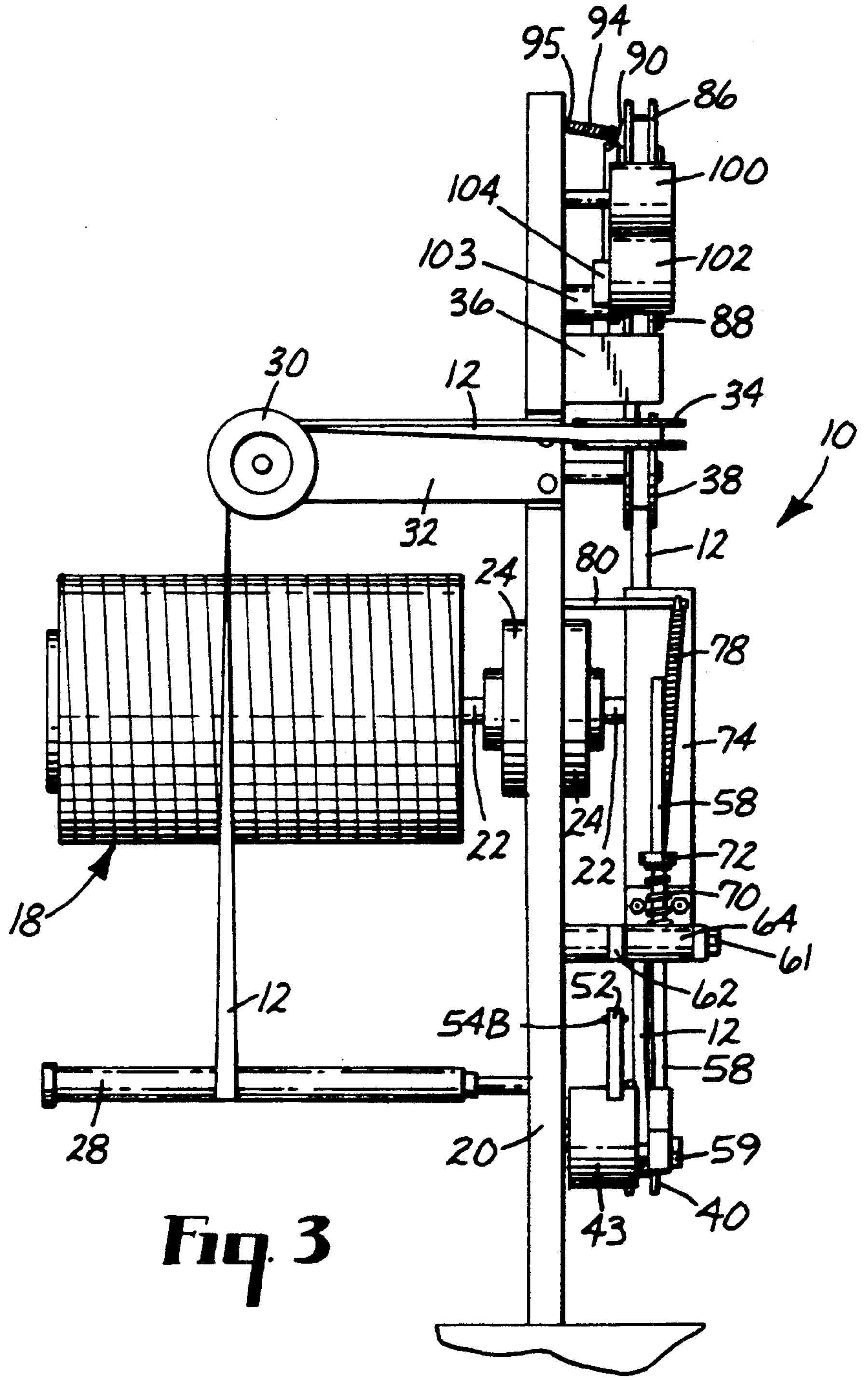
FIG. 3 is a side view in elevation of the apparatus illustrated in FIGS. 1 and 2.

Referring now to the figures, and in particular to FIGS. 1-3, wherein like reference numerals are used to identify like components throughout the several figures, an apparatus 10 is illustrated for processing flexible closure tape 12 into a strip of flexible closure material 14 which is further processed downstream of the apparatus 10 for # application to a receptacle or package by other equipment (not shown). According to the preferred process of the present invention, the flexible closure tape 12 comprises a tape (see FIG. 4-6) of substantially constant transverse width with a plurality of interengaging elements 16 extending from one side surface of the closure tape 12 across the entire transverse width. More specifically, the interengaging elements 16 extend longitudinally along the entire length of the closure tape 12 and define grooves 17 therebetween. Such flexible closure tape is characterized as used in making an intermeshable closure means, which is more completely described in commonly owned U.S. Pat. No. 4,875,259 to Appeldorn, issued Oct. 24, 1989, the contents of which is incorporated herein by reference. A combination of the intermeshable closure means with specific package and receptacles is more fully described in commonly owned copending U.S. application Ser. No. 325,272 filed Mar. 22, 1989, which is also fully incorporated herein by reference.

Referring again to FIGS. 2 and 3, the flexible closure tape 12 is supplied on a spool 18 from which the flexible closure tape 12 is unwound. The spool 18 is rotatably mounted to a support plate 20 by way of an axle 22, which is fixed to rotate with spool 18. The axle 22 passes through support plate 20 and is supported thereon by bearings 24 provided at each side of support plate 20. Also fixed to rotate with axle 22 and spool 18 is a brake drum 26, see FIGS. 1 and 2, the purpose of which will be more fully described hereinafter. The manner of rotatably fixing the spool 18 with the axle 22 and the axle 22 with the brake drum 26 can be any conventional means including keys or the like.

As the closure tape 12 is unwound from the spool 18, it first passes over an idler roller 28 which has a length preferably at least equal to the length of the spool 18. The idler roller 28 thus permits easy unwinding of the closure tape 12 from the spool 18 along the entire length of the spool 18 as the tape 12 is unwound from side to side. The idler roller 28 is mounted to the support plate 20 to extend substantially perpendicular from the plane of the support plate 20 by way of rod 29, and the idler roller 28 can be made up of a series of rollers placed side by side on the rod 29 or can be made of a single long roller mounted on the rod 29. In either case, the roller or rollers are appropriately positioned by thrust bearings on both sides thereof. After passing over idler roller 28, the closure tape 12 is run over a first idler pulley 30 which is rotatably supported at a spaced distance from the support plate 20 by a bracket 32. Between the idler roller 28 and the first idler pulley 30, the closure tape 12 is twisted by 90°.

Next, the closure tape 12 is fed over a second idler pulley 34. As seen in FIGS. 1 and 2, the second idler pulley 34 is rotatably mounted to the support plate 20 by way of a block 36 and a conventional pivot pin extending from block 36 onto which the second idler pulley 34 is mounted in a conventional manner, such as by a snap ring or the like. A 90° twist of the closure tape 12 also takes place between first idler pulley 30 and second idler pulley 34.

After leaving the second idler pulley 34, the closure tape 12 is once again twisted by 90° and is passed over a third idler pulley 38 which is pivotally supported from the support plate 20 by a pin in a conventional manner. The closure tape 12 runs downwardly from the third idler pulley 38 and around a first floating idler pulley 40 which is rotatably mounted by a conventional pin to a pivot arm 42. The pivot arm 42 is mounted to pivot about pivot pin 44 fixed with the support plate 20, and is part of a tensioning means 46 which will be described in greater detail below.

After the tape is run over the first floating idler pulley 40, it travels upward and over a fourth idler pulley 48 rotatably mounted to the support plate 20 in a conventional manner and then downwardly once again to a second floating idler pulley 50 also rotatably mounted to the pivot arm 42 in a conventional manner. It is understood that any number of such loops between a definitely located pulley on the support plate 20 and a relatively movable pulley on the pivot arm 42 can be provided with the further understanding that the more loops that are provided the less tension that there will be imparted to the flexible closure tape 12. Moreover, the degree of tension is a function of the machine requirements.

As best seen in FIG. 1, the tensioning means 46 includes the pivot arm 42 and pivot pin 44 as described above, and further includes a short arm 52 that also pivots about pivot pin 44 and which rotates fixed with pivot arm 42. Preferably, the short arm 52 is connected by welding or the like to the collar 43 of the pivot arm 42 which fits around pivot pin 44. As the source of the tensioning force, a tension spring 54 is provided fixed at one end 54A to the support plate 20 and at its second end 54B to the distal end of the short arm 52. As can be seen, the tension spring 54 tends to pull end 54B toward end 54A and thus to rotate short arm 52 with pivot arm 42 in a clockwise manner about pivot pin 44. As a result, the first and second floating idler pulleys 40 and 50 are urged downwardly away from the third and fourth idler pulleys 38 and 48. The greater the tensile force of the tension spring 54, the greater is the tendency of the pivot arm 42 to move clockwise and the greater is the tension imparted to the closure tape 12. It is also contemplated that an adjustment mechanism can be provided between the end 54B of spring 54 and short arm 52 in order to increase or decrease the tensile force by changing the length of the spring 54.

The tensioning means 46 works in conjunction with a braking means 56 which is controlled by movement of the pivot arm 42. Specifically, a vertical rod 58 is pivotably mounted to the pivot arm 42 at 59 and extends upwardly through a brake lever 60 which is likewise pivotably mounted to the support plate 20 at 61. As seen in FIG. 2, the brake lever 60 comprises two spaced elements 62 connected by a journal 64 at the pivot end thereof and a slide plate 66 near a distal end thereof. The slide plate 66 includes an aperature therethrough through which the vertical rod 58 slidably passes. A thrust washer 68 is also slidably disposed on the vertical rod 58 positioned adjacent the slide plate 66. Above the thrust washer 68 on the vertical rod 58, a compression spring 70 is provided, and a fixed thrust bearing 72 abuts the upper end of the compression spring 70. The compression spring 70 tends to push the brake lever 60 about pivot 61 when the pivot arm 42 is located sufficiently low such that the fixed thrust bearing 72 is engaged with the compression spring 70 to force the compression spring 70 against the slide plate 66 of brake lever 60.

Also attached at the very distal end of the brake lever 60 is first end of a band brake 74. The band brake 74 passes over the brake drum 26 to almost surround the brake drum 26 and is fixed at its opposite end to the support plate 20 by a fixed pin 76. A brake release tension spring 78 is further connected between a fixed pin 80 of the support plate 20 and the first end of the band brake 74 that is attached to the distal end of the brake lever 60. Spring 78 tends to urge the release of the band brake 74 from the brake drum 26. The operation of the tensioning means 46 and the braking means 56 with respect to controlling the tension of the flexible closure tape 12 as it passes through the appratus 10 will become more apparent in the description of the operation of the apparatus 10 described below.

After the flexible closure tape 12 leaves the second floating idler pulley 50, or the outwardmost floating idler pulley if more or less than two are used, the closure tape 12 passes over a fifth idler pulley 82 and approaches a separating means 84. At the separating means 84, the single width of flexible closure tape 12 is divided into two strip portions 12A and 12B. The strip portions can be of equal width or unequal width depending on the specific situation. In the embodiment whereby two strip portions are intermeshed to make a single strip of flexible closure material 14, the strip portions 12A and 12B are preferably of substantially equal width. The separating means 84 comprises a first guide pulley 86 and a second guide pulley 88 spaced a distance from the first guide pulley 86. Both the first and second guide pulleys 86 and 88 are freely pivotably mounted to a pivoted bracket 90 which is mounted to the support plate 20 in a conventional manner by a pivot at 91. Also stationarily mounted to support plate 20 adjacent to the pivoted bracket 90 is a razor blade 92. The bracket 90 and the first and second guide pulleys 86 and 88 pivot together about pivot 91 and are urged to pivot clockwise about pin 91 by a tension spring 94 connected between the distal end of bracket 90 and the support plate 20 at pin 95.

Figure 5:
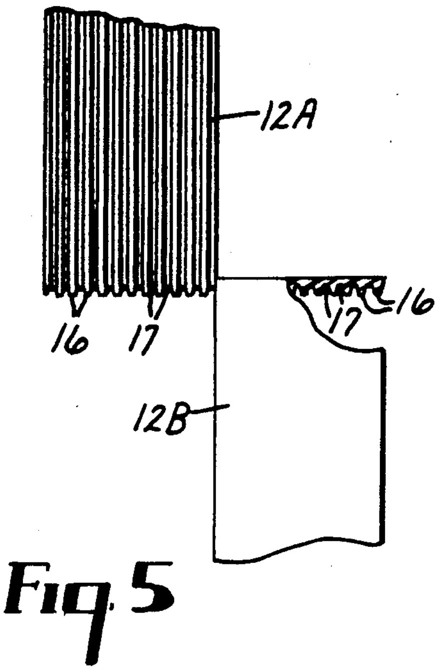
FIG. 5 is a cross-sectional view taken along line 5—5 in FIG. 1 illustrating the tearing of a single width tape of flexible closure material into two strip portions which are intermeshed and mated as in FIG. 4 after separation.

As seen in FIG. 5 at the point of separation of the flexible closure tape 12 into strip portions 12A and 12B, strip portion 12A is guided upwardly about the first guide pulley 86 while the strip portion 12B is guided downwardly over second guide pulley 88. FIG. 5 illustrates how the strip portions 12A and 12B are guided apart so as to cause continuous longitudinal tearing of the flexible closure tape as the strip portions 12A and 12B are pulled after set up. Strip portions 12A and 12B then converge on one another as they approach a mating means 96. During this convergence, one of strip portions 12A or 12B is twisted by 180°. The mating means 96 includes a guide 98 which laterally stabilizes the strip portions 12A and 12B and first and second pinch rolls 100 and 102 through which the strip portions 12A and 12B pass while the interengaging elements 16 of strip portions 12A and 12B are intermeshed with one another. The second pinch roll 102 is adjustably mounted on the support plate 20 to pivot about point 103 by way of a first arm 104 between the pivot of pinch roll 102 and pivot 103 and a second arm 106 extending from pivot 103. The second arm 106 is connected to a tension spring 108 which urges the second pinch roll 102 into contact with the first pinch roll 100. It is also contemplated that a fixed adjustment means could be substituted for the spring bias 108 in that a threaded lead screw could be rotationally pivoted to the arm 106 to pass through a threaded block fixed to the support plate 20 such that turning of the lead screw would determine the nip between pinch rollers 100 and 102.

Figure 4:
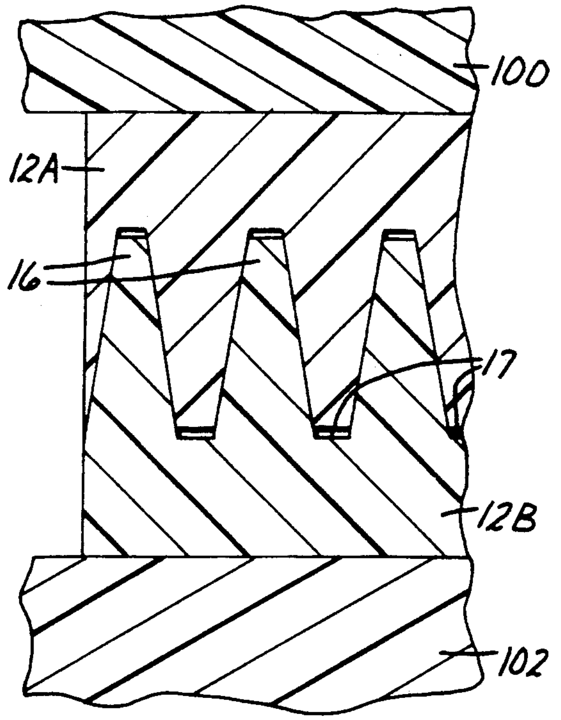
FIG. 4 is a cross-sectional view taken through line 4—4 of FIG. 1 illustrating the mating of the flexible closure strip portions into a flexible closure strip for application to a receptacle down line.

Once the flexible closure material 14 exits the nip between pinch rollers 100 and 102, the apparatus according to the present invention has completed its proces and the flexible closure material 14 is ready to be further processed by additional equipment for fixation to a receptacle. FIG. 4 shows a partial cross-sectional view taken through the first and second pinch rolls 100 and 102 illustrating the intermeshed strip portions 12A and 128. Note that the pinch rolls 100 and 102 need not be rotatably mounted, but may or may not be as desired. If a low friction material is used, the pinch rolls may actually constitute non-rotating pins.

The operation of the apparatus 10 and the process steps that take place along the apparatus 10 will now be described. The flexible closure tape 12 is supplied on a spool 18 and is mounted to rotate with the axle 22. The flexible closure tape 12 then passes over a portion of the length of idler roller 28 depending on the location that the tape 12 is taken from the spool 18 and thereafter passes over first idler pulley 30 while twisting by 90°. Then, the closure tape 12 again twists by 90° and runs over second idler pulley 34, after which the tape 12 is again twisted by 90° to pass over third idler pulley 38. The closure tape 12 then runs downwardly over the first floating idler pulley 40, upwardly and over the fourth idler pulley 48, downwardly and over the second floating idler pulley 50, and upwardly to the fifth idler pulley 82. In setting up the apparatus 10 for continuous processing of the flexible closure tape 12 thereafter, the tape 12 is threaded as above. After the closure tape 12 passes the fifth idler pulley 82, a longitudinal separation of the closure tape 12 must be initiated at machine set up. In this regard, the operator of the machine can begin the separation by simply manually cutting a slit in the end of the closure tape 12 by using the razor blade 92 or otherwise.

Thereafter, the separation of the closure tape 12 into strip portions 12A and 12B is accomplished by tearing the flexible closure tape 12 along its longitudinal length at the separation means 84. This tearing occurs as one strip portion is guided upwardly over the first guide pulley 86 while the other strip portion 12B is guided below the second guide pulley 88. Moreover, and in accordance with the preferred flexible closure tape 12 utilized in the present invention, the longitudinally extending interengaging elements 16 with intermediate grooves 17 greatly facilitate the longitudinal tearing of the flexible closure tape 12. As a matter of fact, the grooves so definitely define the line of separation, once initiated by an operator, such that the tearing operation provides substantially even edges to both strip portions 12A and 12B at the line of tearing. These even edges are beneficial in that it is much easier then to mate the strip portions 12A and 12B with a common torn edge and to accurately align that edge in the further processing of the flexible closure material 14 as applied to receptacle material.

After the strip portions 12A and 12B pass over the first and second guide pulleys 86 and 88, respectively, the strip portions 12A and 12B are converged upon one another toward the pinch rolls 100 and 102. One of the strip portions, either 12A and 12B, must be twisted by 180° such that the interengaging elements 16 on each of the strip portions 12A and 12B are brought into intermeshing engagement with one another. This twisting is assisted by the guide 98 which helps locate the strip portions 12A and 12B laterally with respect to one another. Lastly, the strip portions 12A and 12B mesh with one another and pass between the first and second pinch rolls 100 and 102 and the flexible closure material 14 comprised of a plurality of strip portions having interengaging elements in mesh with one another exits the apparatus 10.

Once the apparatus 10 is threaded with the flexible closure tape 12 and a portion of flexible closure material 14 is provided exiting from the apparatus 10, the subsequent tearing and mating operations occur as the flexible closure material 14 is pulled from the apparatus 10 by a next processing station. Thus, there is no positive driving force provided by the present invention, although it is contemplated that such could be provided by connecting a drive mechanism to any one of the idler pulleys or the pinch rolls. Preferably, the apparatus 10 operates in response to the needs of a machine located in line and downstream from the apparatus 10. With this in mind, the operation of the tensioning means 46 and the braking means 56 will now be described.

The apparatus 10, in its rest position as illustrated in FIGS. 1 and 2, shows the pivot arm 42 in its lowermost position as limited in that direction by the vertical rod 58, compression spring 70, brake lever 60, and band brake 74. The pivot arm 42 is urged into this position by the tensile force of tension spring 54. As the flexible closure material 14 is required from the machine down line of the apparatus 10, the flexible closure tape 12 will be pulled toward the separating means 84 where the flexible closure tape 12 is torn into strip portions 12A and 12B. In response, the pivot arm 42 reacts by moving upwardly, that is counterclockwise about pivot 44, against the bias of spring 54. During this upward travel, vertical rod 58 is also moved upwardly, spring 70 is relieved of effect against the brake lever 60 and the brake release tension spring 78 releases the engagement of the band brake 74 from the brake drum 26. Then, if there is a substantially constant requirement for the flexible closure material 14, the pivot arm 42 will assume an equilibrium position somewhere between its lowermost position and the uppermost position that it moved to when the pulling on the flexible closure tape 12 was initiated. The apparatus 10 will then continue to operate in this equilibrium position until the supply of flexible closure material 14 is halted or the speed of requirement changed. That is, if the speed of requirement is increased, the pivot arm 42 will jump upwardly and will then assume a new equilibrium position. If the speed of requirement is lowered, then the pivot arm 42 will fall and assume a new equilibrium position.

If the requirement for the flexible closure material 14 is intermittent, the pivot arm 42 will cycle for each intermittent requirement. If the intermittent speed is sufficiently slow, the pivot arm 42 will move fully upwardly from its lowermost position then downwardly to an equilibrium position and then again fully downward to its rest position when the requirement is stopped. This cycle will occur over and over as the requirement is made. If the intermittent requirement is at a somewhat higher pace, once the pivot arm 42 moves from its lowermost rest position, it will move upwardly upon initiation, will drop to an equilibrium position, and before it falls to its lowermost rest position it will again be urged upwardly upon initiation of the next requirement. In other words, after the initial move from the rest position, the pivot arm 42 will jump between an upward position at the initiation of each requirement and an equilibrium position inbetween.

When the pivot arm 42 gets near its rest position, the vertical rod 58 is also moved downwardly and the fixed thrust bearing 72 engages the compression spring 70 which then pushes against the brake lever 60 causing the band brake 74 to engage the brake drum 26 to eventually stop rotation of the brake drum 26. Since the brake drum 26 is fixed with axle 22 that is further fixed with spool 18, the supply of flexible closure tape 12 is also advantageously stopped. This prevents slack from developing within the system when the requirement for flexible closure material 14 is stopped.

As also described above, the first and second guide pulleys 86 and 88 are mounted to a bracket 90 which is pivoted about point 91. Moreover, the bracket 90 is urged clockwise about pin 91 by tension spring 94. The reason for pivoting the guide pulleys 86 and 88 with bracket 90 about pin 91 relative to the stationary razor 92 is so that if any difficult-to-tear portion of the tape 12 is encountered, such as at a splice, the razor 92 will assist in cutting that difficult portion of the tape 12. This happens because as the strip portions 12A and 12B are pulled about the first and second guide pulleys 86 and 88, respectively, and as there is an increased resistance to tearing at the separation point illustrated in FIG. 5, the guide pulleys 86 and 88 will be urged against the bias of spring 94 with bracket 90 to move counterclockwise about pivot point 91. As a result, the separation point will be brought into contact with the razor blade 92 which is fixed in position to the support plate 20. Then, once the area of increased resistance is passed, the normal tearing operation resumes and the guide pulleys 86 and 88 with bracket 90 again assume their normal operating position as influenced by tension spring 94.

Figure 6:
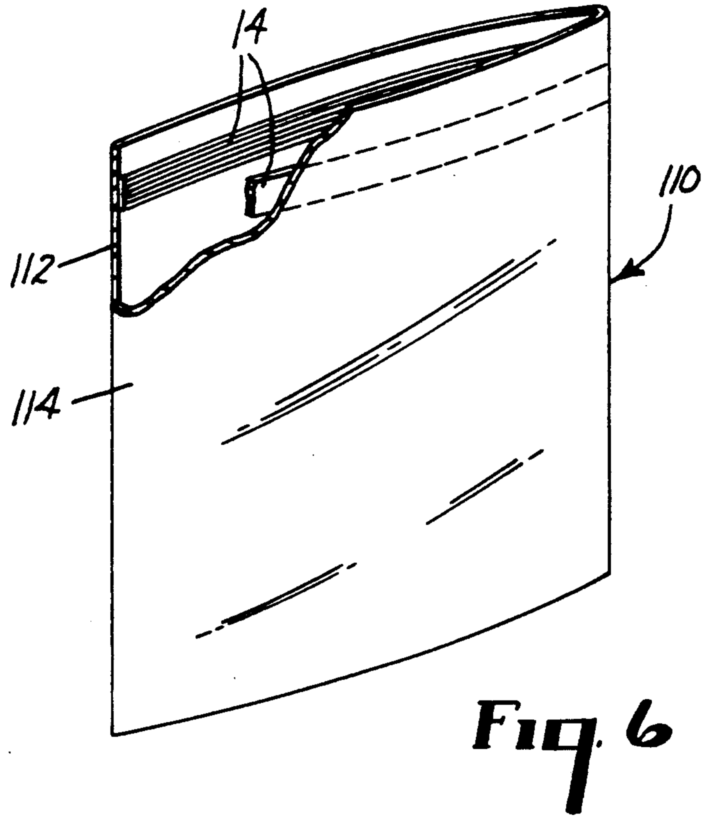
FIG. 6 is a perspective view of a flexible receptacle provided with the preferred embodiment of the flexible closure material processed in accordance with the present invention.

Referring now to FIG. 6, a flexible receptacle 110 is illustrated comprising a bag having opposed side walls 112 and 114 affixed with the flexible closure material 14 of the present invention. Although not specifically a part of the present invention, a receptacle processing station located downstream of apparatus 10 makes a demand for the flexible closure material 14 as it exits the apparatus 10 of the present invention, whereat the flexible closure material 14 with the intermeshed strip portions is fixed between layers of polymeric film in the case of a plastic bag. The flexible closure material 14 can be affixed by heat sealing, adhesive or the like to the receptacle material such as polymeric film. The flexible closure material 14 can be fixed while the strip portions are interengaged to ensure proper alignment of the strip portions relative to one another as positioned on the receptacle. Then, the receptacle is formed by a heat sealing technique or the like into a bag or other receptacle.

Figure 7:
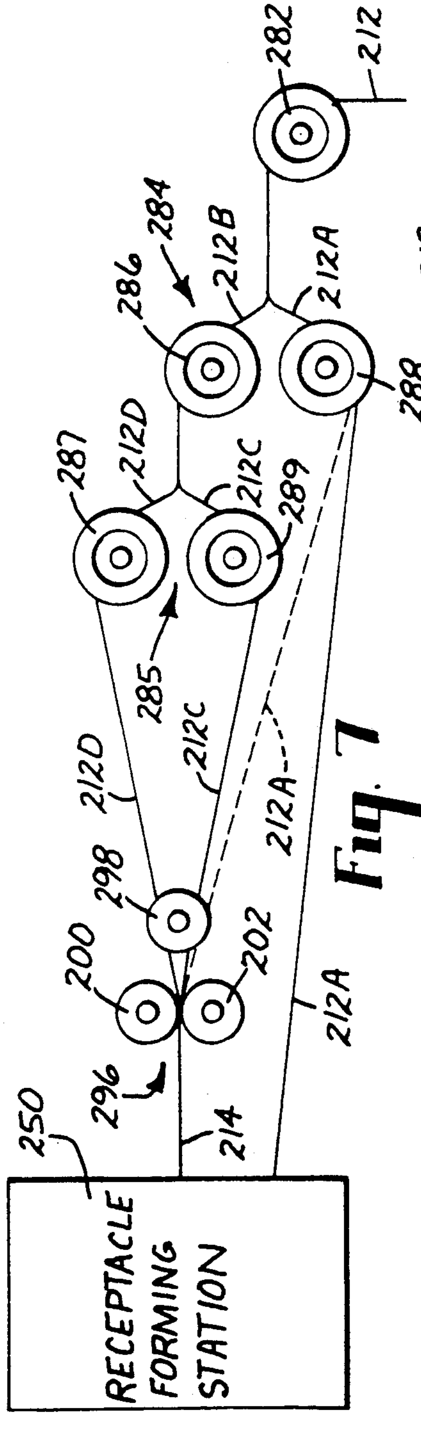
FIG. 7 is a schematic illustration of a processing apparatus including a plurality of separation stations in line with a receptacle forming station.

Referring now to FIG. 7, a schematic drawing illustrates how the above described tearing and mating process can be expanded to perform a plurality of tearing operations. In general, a plurality of such tearing steps can be done by multiplying the number of separating means 84.

In such a case, a flexible closure tape 212 is shown at the point subsequent to a tensioning means and supply means as described above with regard to FIGS. 1-3. The flexible closure tape 212 is shown passing over an idler pulley 282 and then to a first separating means 284. At the first separating means 284, the flexible closure tape 212 is split into a first strip portion 212A which is guided over a guide pulley 288 and a second strip portion 212B which is guided over a guide pulley 286. Subsequently, the strip portion 212B is once again separated at a second separating means 285 into strip portions 212C and 212D which pass over guide pulleys 289 and 287, respectively. Then, the strip portions 212C and 212D pass through guide 298, one of strip portions 212C or 212D is twisted by 180°, then they are mated at the mating means 296 by way of pinch rolls 200 and 202. Meanwhile, the first strip portion 212A is shown leaving the guide pulley 288 and going to a receptacle forming station 250 for additional processing. Likewise, flexible closure material 214 leaving the mating means 296 enters the receptacle forming station 250.

Thus, it can be seen that any number of separating means can be sequentially provided for tearing a single width of supplied flexible closure tape 212. It is also contemplated that the strip portion 212A could be additionally run into the mating means 296 between pinch rolls 200 and 202, as illustrated by the broken line in FIG. 7. In this case, it would be possible to mesh both strip portions 212A and 212C together with the single strip portion 212D. In the same sense, strip portion 212D could be separated once more and the two strip portions formed thereby could be directed to mesh with the two strip portions 212A and 212C. In other words, plural flexible closure material strips 214 can be made at the same time from a single supplied flexible closure tape 212 by multiplying the number of separating means and mating means.

Figure 8:
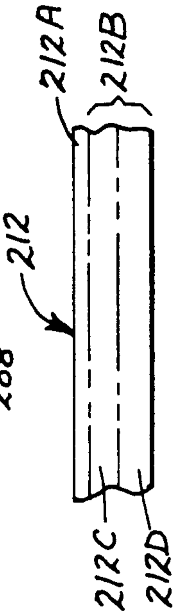
FIG. 8 is a top view of a preferred embodiment of the flexible closure tape to be processed according to the present invention.

FIG. 8 illustrates a preferred division of a strip of flexible closure tape 212 as it would be processed according to the schematic of FIG. 7. Specifically, at separating means 284, the closure tape 212 would be separated into a very narrow strip portion 212A and a relatively large strip portion 212B. Subsequently, at separating means 285, the strip portion 212B would be further separated into substantially equal strip portions 212C and 212D. In accordance with this preferred embodiment of the division of the closure tape 212, the strip portions 212C and 212D of substantially equal width are mated between pinch rolls 200 and 202 and exit as the flexible closure material 214 to be applied to a receptacle such as that illustrated in FIG. 6. The narrow strip portion 212A, when separately run to the receptacle forming station 250, can advantageously be used as a tear strip which can be applied to at least one of the side walls of a flexible receptacle such as that illustrated in FIG. 9. Tear strips, per se, are well known in the art of flexible bags and packages, but the present invention beneficially permits the tear strip to be formed from the same material as the closure material which can be processed in line at the same speed and with the same requirements as the flexible closure material 214. Furthermore, the bag 252 illustrated in FIG. 9 may be provided with a notch at 254 which assists the easy opening feature defined by the tear strip 212A.

Figure 9:
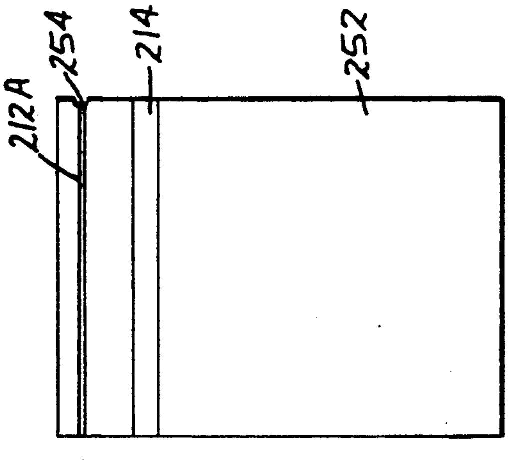
FIG. 9 illustrates an example of a flexible receptacle utilizing the flexible closure material of the present invention along with an easy open tear strip feature.

As a particular preferred example of a strip 212 that is to be processed for the making of a flexible bag as in FIG. 9, a $\frac{1}{2}$" strip of flexible closure tape 212 is supplied. Then, a $\frac{1}{8}$" easy open tear strip 212A is separated from the strip portion 212B at the first separating means 284 leaving a $\frac{3}{8}$" strip portion 212B. Next, at separating means 285, the strip portion 212B is once again separated into two substantially equal strip portions 212C and 212D each having a width of 3/16". The result is a flexible closure material 214 which is affixed to the film forming the bag 252 defining a 3/16" closure. The $\frac{1}{8}$" easy open tear strip 212A is also fixed to the bag forming film to function as an easy opening feature. Preferably, notch 254 is also included.

Although the process described above makes use of a flexible closure tape of the type shown and described in the Appeldorn, U.S. Pat. No. 4,875,259, it is understood that many other types of flexible closure tapes can be so processed. Since the process relies on tearing of the flexible tape and remating of the torn strip portions, it is preferable that any flexible closure tape supplied include a longitudinally extending structured surface which helps limit the tearing. If a flexible closure tape is being produced having discrete structured interengaging elements, it is possible to further define small ribs or a weakened line along the tape in addition to the interengaging elements for guiding the tearing operation.

Figure 10:
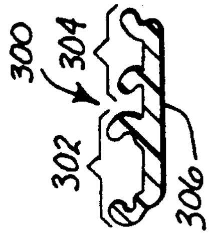
FIG. 10 is a transverse cross-sectional view of another embodiment of a flexible closure tape processed in accordance with the present invention.

Referring now to FIG. 10, another embodiment of a flexible closure tape is shown at 300. In this embodiment, the flexible closure tape 300 includes a female interlocking strip portion 302 and a male interlocking strip portion 304. As can be clearly seen, once the male strip portion 304 is longitudinally separated from the female strip portion 302, the male portion 304 will be able to be mated within the female strip portion 302. Such a flexible closure tape 300 could just as easily be processed as above by tearing between strip portions 302 and 304 at 306. Then, after passing over the guide pulleys at the separation station, one of the strip portions would be twisted by 180° and they would be brought together and mated between pinch rolls in the same fashion as above.

Figure 11:
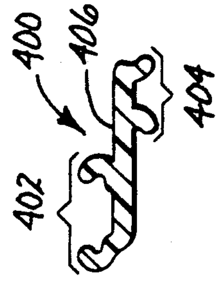
FIG. 11 is a transverse cross-sectional view of yet another embodiment of a flexible closure tape processed in accordance with the present invention.

Referring now to FIG. 11, this flexible closure tape 400 could be processed similarily as the flexible closure tape 300 by longitudinally tearing female strip portion 402 from male strip portion 404 along 406. This closure tape, however, has a further advantage in that there is no need to twist either of the twist portions 402 or 404 after the tearing and guiding. The strip portions would be simply separated and then mated between pinch rolls. This same principle could be applied to the above intermeshing flexible closure, if the tape were extruded that way.

While a preferred embodiment of the apparatus of the present invention has been specifically described above so as to enable one of ordinary skill in the art to practice the techniques of the present invention, the preceding description is intended to be exemplary and should not be used to limit the scope of the present invention. The scope of the invention should be determined only be reference to the following claims.

We claim:

1. A process of providing a strip of flexible closure material comprised of a combination of a plurality of interengaging strips, said process comprising the steps of:

(a) supplying a tape of flexible closure material having a transverse width with a plurality of interengaging elements across the transverse width extending from the tape;

(b) separating the tape along its longitudinal length into a plurality of strip portions defining at least two divided strip portions, each of said divided strip portions having an interengaging element extending therefrom; and (c) bringing said two divided strip portions that were separated from one another into contact with one another while mating the interengaging element of one of the strip portions brought together with the interengaging element of another one of the strip portions.

2. The process of claim 1, wherein said step of separating the tape along its longitudinal length into a plurality of strip portions comprises tearing said tape along its longitudinal length.

3. The process of claim 2, wherein said step of separating the tape along its longitudinal length further comprises tearing the tape intermediate of longitudinally extending interengaging elements, thus leaving a longitudinally extending interengaging element on the at least two strip portions.

4. The process of claim 1, wherein the tape supplied in step (a) is provided with a plurality of interengaging elements that extend from a single side surface of the tape, and said step of bringing the strip portions having an interengaging element into contact with one another further comprises twisting one of the strip portions brought together to facilitate said mating of the interengaging elements thereof.

5. The process of claim 4, wherein said step of separating the tape along its longitudinal length further comprises tearing the tape intermediate of longitudinally extending interengaging elements, thus leaving a longitudinally extending interengaging element on the at least two strip portions.

6. The process of claim 1, wherein the tape supplied in step (a) is provided with an interengaging element that extends from one side surface of the tape and an interengaging element that extends from an opposite side surface of the tape, and said step of bringing the strip portions having an interengaging element into contact with one another further comprises maintaining the strip portions in the same orientation as they were after separation and then closing each strip portion on one another while mating the interengaging elements provided on opposite side surfaces of the tape.

7. The process of claim 1, wherein said step of supplying the tape of flexible closure material further includes tensioning the tape for controlling the separating operation.

8. The process of claim 7, wherein said tensioning step is accomplished by providing a plurality of rollers, at least one of which is biased to move away from another, and the tape of flexible closure material is threaded to run over the plurality of rollers.

9. The process of claim 8, wherein said step of supplying further includes providing a spool of flexible closure material on a rotatable spindle form which the tape of flexible closure material is fed to the tensioning rollers, and said tensioning step further includes applying a braking force against the rotation of the spindle and thus the spool in dependence on the movement of the biased roller.

10. The process of claim 1, wherein said separation step comprises tearing the tape of flexible closure material into two substantially equal width strip portions, each of said equal width strip portions has a plurality of interengaging elements extending from a side surface thereof.

11. The process of claim 1, wherein said separation step comprises a first separating step for dividing the tape of flexible closure material into two strip portions and a second separating step for dividing one of the first divided strip portions into two substantially equal width strip portions, the two substantially equal width strip portions each having a plurality of interengaging elements extending from a side surface thereof so as to together form the strip of flexible closure material applicable to a receptacle, while the other of the first divided strip portions is a tear strip to be used as an easy open feature for the receptacle.

12. The process of claim 11, wherein said first separating step further comprises dividing the tape of flexible closure material into two unequal width strip portions.

13. The process of claim 11, wherein said first and second separating steps comprise tearing.

14. A process of providing a strip of flexible closure material comprised of a combination of a plurality of interengaging strips for application to a flexible receptacle, said process comprising the steps of:

(a) supplying a tape of flexible closure material having a transverse width with a plurality of longitudinally extending interengaging elements formed across the transverse width of the tape;

(b) separating the tape along its longitudinal length intermediate the longitudinally extending interengaging elements into a plurality of strip portions with at least two of the strip portions having a longitudinally extending interengaging element extending therefrom, wherein said step of separating the tape along its longitudinal length into a plurality of strip portions comprises tearing said tape along and as guided by one of the longitudinally extending interengaging elements, thus leaving a longitudinally extending interengaging element on the at least two strip portions; and (c) bringing the two strip portions into contact with one another while mating the longitudinally extending interengaging element of one of the strip portions brought together with the longitudinally extending element of another one of the strip portions.

15. The process of claim 14, wherein the tape supplied in step (a) is provided with an interengaging element that extends from one side surface of the tape and an interengaging element that extends from an opposite side surface of the tape, and said step of bringing the strip portions having an interengaging element into contact with one another further comprises maintaining the strip portions in the same orientation as they were after separation and then closing each strip portion on one another while mating the interengaging elements that were provided on opposite side surfaces of the tape.

16. The process of claim 14, wherein said separation step comprises tearing the tape of flexible closure material into two substantially equal width strip portions, each of which has a plurality of the longitudinally extending interengaging elements extending from a side surface thereof.

17. The process of claim 14, wherein the tape supplied in step (a) is provided with a plurality of interengaging elements that extend from a single side surface of the tape, and said step of bringing the strip portions having an interengaging element into contact with one another further comprises twisting one of the strip portions brought together to facilitate said mating of the interengaging elements thereof.

18. The process of claim 17, wherein said step of separating the tape along its longitudinal length further comprises tearing the tape intermediate of the longitudinally extending interengaging elements, thus leaving a longitudinally extending interengaging element on the at least two strip portions.

19. The process of claim 14, wherein said step of supplying the tape of flexible closure material further includes tensioning said tape for controlling the separating operation.

20. The process of claim 19, wherein said tensioning step is accomplished by providing a plurality of rollers, at least one of which is biased to move away from another, and the tape of flexible closure material is threaded to run over the plurality of rollers.

21. The process of claim 20, wherein said step of supplying further includes providing a spool of flexible closure material on a rotatable spindle from which the tape of flexible closure material is fed to the tensioning rollers, and said tensioning step further includes braking the rotation of the spindle and thus the spool in dependence on the movement of the biased roller.

22. The process of claim 14, wherein said separation step comprises a first separating step for dividing the tape of flexible closure material into two strip portions and a second separating step for dividing one of the first divided strip portions into two substantially equal width strip portions, the two substantially equal width strip portions each having a plurality of the longitudinally extending interengaging elements extending from a side surface thereof so as to together from the strip of flexible closure material applicable to a receptacle, while the other of the first divided strip portions is a tear strip to be used as an easy open feature for the receptacle.

23. The process of claim 22, wherein said first and second separating steps comprise tearing.

24. The process of claim 22, wherein said first separating step further comprises dividing the tape of flexible closure material into two unequal width strip portions.

* * * * *

UNITED STATES PATENT AND TRADEMARK OFFICE

CERTIFICATE OF CORRECTION

PATENT NO. : 5,103,546

DATED : Apr. 14, 1992

INVENTOR(S) : Rossini et al.

It is certified that error appears in the above-identified patent and that said Letters Patent is hereby corrected as shown below:

Col. 5, line 31, Delete "#"

Col. 14, line 5, Replace "form" with --from--

Col. 16, line 19, Replace "from" with --form--

Signed and Sealed this

Seventh Day of September, 1993

Attest:

BRUCE LEHMAN

*Attesting Officer* | *Commissioner of Patents and Trademarks*